INVENTOR
DANIEL BARRON
ATTORNEY ically, use previously obtained BT profiles for the particular area in which the sonobuoy is to operate. Given the data from the BT recorder or from the prior profiles, the operator, from past experience, chooses the depth at which the transducer is to be located and additionally estimates the range which is to be expected from the transducer at the selected depth. To aid in this subjective analysis, the operator may refer to charts and previous data, if available.

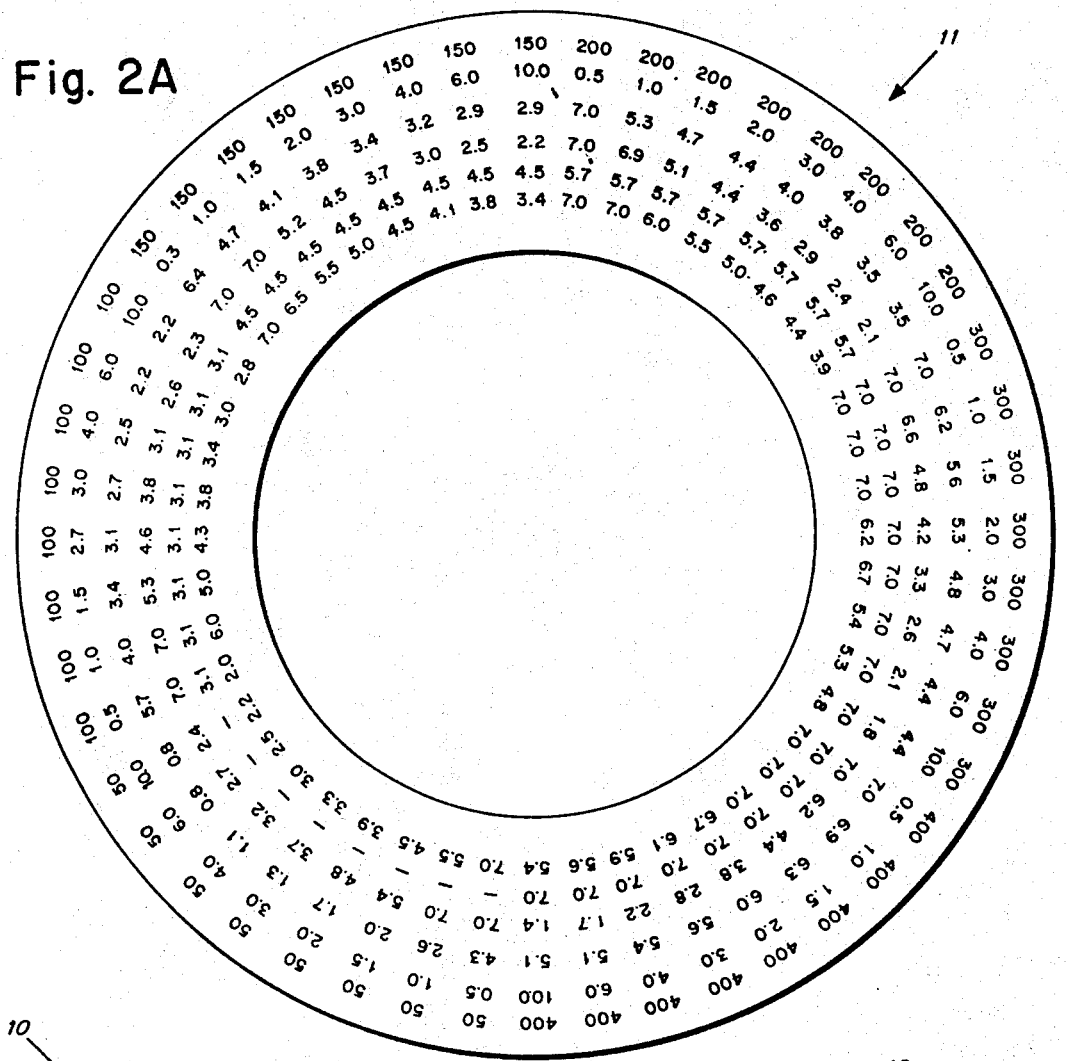

United States Patent Office 3,516,602
Patented June 23, 1970

3,516,602
CIRCULAR SONAR SLIDE RULE
Daniel Barron, 6223 Springhill Court, Apt. 202,
Greenbelt, Md. 20770
Filed Jan. 25, 1968, Ser. No. 703,226
Int. Cl. G06c 3/00
U.S. Cl. 235—88          1 Claim

ABSTRACT OF THE DISCLOSURE

A circular sonar slide rule for determining the optimum depth to position an active sonobuoy and for predicting the best estimated range of that sonobuoy at the optimum depth. The rule comprises an outer and inner plate the confronting edges of which are grooved to receive an annular resilient retaining ring which both secures the plates together and permits the relative rotation thereof. A cursor is rotatably secured to the inner plates. Sonar information is provided in predetermined fashion to enable the rule to be read along any radial segment thereof upon correlation of the plates and cursor.

The invention described herein may be manufactured and used by or for the Government of the United States of America for governmental purposes without the payment of any royalties thereon or therefor.

BACKGROUND OF THE INVENTION

The present invention relates to a circular slide rule and more particularly to a slide rule used during underwater target detection operations for determining optimum sonar transducer depths and for predicting the best estimated sonar range.

One method for detecting, locating, and classifying underwater targets embodies a helicopter or other aircraft equipped with airborne sonar equipment and a sonar transducer such as a sonobuoy which is dropped into the sea from the aircraft by parachute, for example, to pick up the underwater sounds reflected off a submarine or other target and transmit them back to the aircraft.

To track a submarine, several active sonobuoys may be dropped in a pattern that includes the known or suspected location of the submarine with each buoy transmitting an identifiable acoustic signal. An electronic computer in the aircraft then determines the location of the submarine by comparison of the received signals and triangulation of the resulting time delay data, for example.

In order to determine the proper tactics, for example, localization, search, or formation (terms known in the art), for the detection of the underwater target, it is important that the sonar operator be able to predict the best estimated sonar range (ESR) of the transducer when it is operating at a particular, desired depth. The estimated sonar range is defined as the range which will give 50% probability of detecting a target.

It is known that the behavior of sound in seawater, and therefore the performance of sonar equipment, is dependent among other things upon the temperature condition of the body of water in which the detection operation is taking place. Temperature condition depends upon the depth to which reference is being made, the pressure effect at this depth, and the surface temperature. Each of these factors is important in the determination of the best depth to operate the sonar equipment and in the prediction of the range which will be obtained when operated at this depth. Presently, sonar operators either use a bathythermograph (BT) which automatically measures the water temperature as a function of depth and provides a record (called the bathythermogram) or, alterna- A more objective method employed by the operator involves ray plotting. In this latter method an actual diagram is made of the sonar ray path. This diagram gives a picture of the paths of sound in and below the surface isothermal layer (that layer of water just below the surface for which the temperature is constant), the amount of refraction, reflection bounces, the inclination of the sound path which is refracted downward, the shadow zone, the depth of an initial contact for a particular range below the surface layer, and other information. The plotted ray path is that of the limiting ray which is the ray which bounds the area of ensonified water in the thermocline, and is the ray that is used for geometric range prediction. The method utilized for plotting these curves employs Snell's law and may be obtained from any standard test. For example, see "Fundamentals of Sonar" by J. W. Horton, published by the U.S. Naval Institute in 1957.

Each of these methods consumes valuable operator-time and aircraft space for the plotting equipment, the many maps, and all the other requisite paraphernalia.

SUMMARY OF THE INVENTION

Accordingly, it is the general purpose of the present invention to provide a circular sonar slide rule for use in determining the best depth to operate an active sonobuoy and the expected sonar range thereof in the detection of underwater targets.

The rule comprises, in a preferred embodiment thereof, an annular plate circumscribing a circular plate, the confronting edges of the two plates being grooved or beveled to form a hollow annular cylinder therebetween for receiving a split retaining ring having spring characteristics. The resilience both of the ring and the plates permit the ring to be snapped onto the circular plate and the annular plate to be concomitantly snapped onto the ring and circular plate combination thereby producing a rotatable relationship therebetween in a single plane. A cursor is rotatably connected to the center of the circular plate and extends radially over both the circular and annular plates. Sonar information is provided upon the cursor, the annular plate, and the front and back of the circular plate in predetermined manner to afford a means for rapidly determining the best depth to drop a sonobuoy and the best estimated range of the hydrophone thereof. The annular plate is divided into 48 radial segments (for reasons to be explained hereinafter) and the desired sonar information is read along one of these radial segments by positioning the aperture of the cursor thereover. The circular plate is divided into 15 radial segments, sonar information being read in like manner as the annular plate. Both the annular plate and the circular plate comprise a plurality of scales, arranged annularly about the respective plates and correlated by the sonar indicia of the cursor.

Each radial column, from the outermost scale of the annular plate to the innermost of the circular plate, is distinct from the others and is representative of a particular set of sonar conditions. The portion of the radial column comprising the sonar data of the annular plate is representative of geometrical range considerations while the portion comprising the circular plate is representative of the power capabilities of the particular hydrophone as effected by wattage output, sea noise, propagation loss and other factors.

Accordingly, the present sonar slide rule enables the sonar operator to rapidly and accurately determine the best depth to which the active sonobuoy is to be dropped and the range to which the sonobuoy hydrophone can be expected to be efficient, all of which information is obtained without resorting to any graphs, pages of tables, or plotting equipment.

BRIEF DESCRIPTION OF THE DRAWING

FIG. 1 illustrates an isometric view in half section of the slide rule (sonar data not shown) in accordance with the invention;

FIG. 2a is a plan view of the annular plate of the slide rule of FIG. 1 with sonar data of layer depth, temperature gradient and ray path thereon;

FIG. 2c is a plan view of the cursor of the slide rule along with a portion of the circular and annular plates arranged for computation;

FIG. 4a is a typical bathythermogram similar to that of FIG. 3a;

DESCRIPTION OF A PREFERRED EMBODIMENT

Figure 2B:
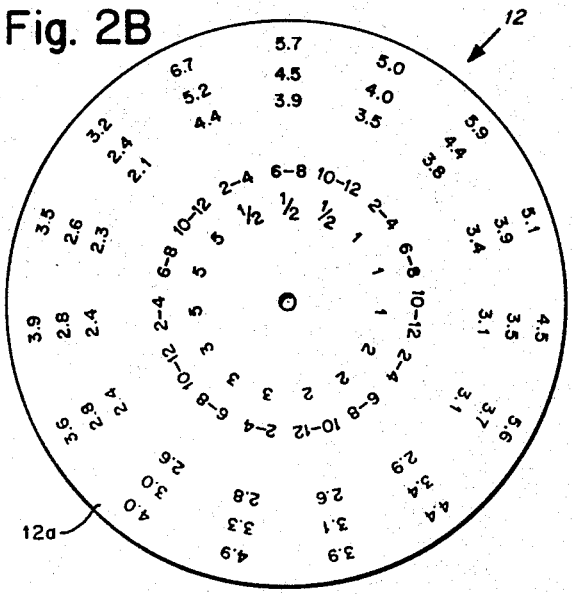
FIG. 2b is a plan view of the circular plate of the slide rule of FIG. 1 with sonar data of range, channel number and sea state thereon.

Referring now to the drawing and more specifically to FIG. 1, the circular slide rule 10 includes an annular outer disk or plate 11 and a circular inner disk or plate 12 concentric therewith. The respective confronting edges 13 and 14 of the two plates are grooved or beveled inwardly as shown to form a hollow annular cylinder of a diameter smaller than the thickness $\tau$ of the rule. Positioned within this cylinder is a split retaining ring 15 which may be made of steel or other like material having spring characteristics. The ring 15 biases against the confronting edges 13 and 14 and thereby provides a relatively snug fit with sufficient latitude or "play," however, to permit the relative motion of the two plates. Since the groove in each of the plates 11 and 12 is of smaller diameter than the thickness $\tau$ of the rule, abutting lips or overhang portions 16 and 17 are formed which serve to interlock the ring 15 therebetween.

At the center of the circulate plate 12, a cursor 18 is pivotally secured by a rivet 19 or the like. Cursor 18 extends radially outward across both circular plate 12 and annular plate 11 and is rotatable independently from both plates. An aperture 20 is provided therein so that the scales on plates 11 and 12 may be read. Alternatively, the cursor 18 may be constructed of clear plastic thereby eliminating the need for the aperture. For simplicity, the rule shown in FIG. 1 bears no sonar data. However, it is to be understood that such data does appear thereon in predetermined fashion as can be seen in FIGS. 2a through 2d and as will be hereinafter explained.

The present slide rule is designed for use with existing active sonobuoys equipped with omnidirectional hydrophones which, due to the characteristics thereof, are dropped into the sea at either 60 feet or 800 feet below the layer depth. Since the layer depth is the depth of the isothermal layer, when a sonobuoy is at either of the above-mentioned depths the temperature gradient will be negative, i.e., decreasing at the rate of 2°/100′ for example.

Prior testing and analysis have revealed that it is this temperature gradient that is the most significant parameter in determining geometric range capability. Moreover, this same testing and analysis have shown that the temperature gradient in degrees Fahrenheit per hundred feet (° F./100 ft.) can practically be represented for most bodies of water with only 8 values thereof being specified. These values are 0.5, 1.0, 1.5, 2.0, 3.0, 4.0, 6.0, 10.0.

In like manner, empirical testing has shown that for practical purposes little error is introduced if but 6 layer depths are considered, these depths being 50, 100, 150, 200, 300, and 400 feet. Accordingly, layer depths are rounded off at 50 foot intervals for isothermal layers less than and equal to 200 feet and at 100 foot intervals for layer depths between 200 and 400 feet. Little error is introduced here as layer depths greater than 400 feet have been found to rarely, if ever, occur and testing has shown that for layer depths greater than 200 feet, favorable results are obtained when 100 foot intervals therebetween are considered.

Accordingly, the various layer depths occurring in most bodies of water can for practical purposes be represented by depths of 50, 100, 150, 200, 300, and 400 feet. The special case where the layer depth is less than 50 feet will be discussed hereinafter.

Thus, as can be seen by referring to FIGS. 2a–2d, inclusive, and more particularly to FIG. 2a, the annular plate 11 is divided into 48 separate radial segments, (as noted heretofore) this number being the product of the eight (8) practical temperature gradients and the six (6) practical layer depths.

There are six scales appearing on plate 11, each scale being a concentric circle or row of numbers. The outermost scale contains information pertaining to the layer depth and is expressed in feet. The layer depth is depicted in 50 foot intervals every eight radial segments of arc for layer depths between 50–200 feet, inclusive, and in 100 foot intervals for layer depths between 200–400 feet, inclusive, in accordance with the aforementioned empirical testing.

Immediately below the layer depth scale, each of the eight temperature gradient values are presented, this cycle of numbers being repeated every eight radial segments of arc. Thus it should now be apparent that for any given layer depth appearing on the outermost scale, there appears on the next inner scale in one-to-one correspondence along a radial segment one of the eight practical temperature gradients.

When the sonobuoy is placed at either 60 feet or 800 feet below the layer depth, it is desired to determine both BDR and PDR.

BDR may be defined as the best depth range to avoid detection by a sonobuoy. That is, BDR is that range from the sonobuoy or transducer at which the target is least detectable. The depth of the target in this situation is usually on the order of 100 feet below the layer depth. The PDR is the periscope depth range and is that range from the sonobuoy when the target, should it be a submarine for example, is snorkeling. The depth of the target in this situation is generally 50 feet below the surface of the water. These two quantities, BDR and PDR, will be more fully discussed hereinafter. At present, it is noted that the cursor of FIG. 2c is provided among other things with the indicia, "ray path: BDR—60 feet, BDR—800 feet and ray path: PDR—60 feet, PDR—800 feet."

The four inner scales of the annular plate 11 represent the range information for each combination of layer depth and temperature gradient in the same radial column as determined by geometric considerations derived from ray diagrams. These numbers are read in conjunction with the indicia mentioned above appearing upon the cursor 18. Thus, the outermost of these four scales gives BDR information when the sonobuoy is 60 feet below the layer depth. Similarly, the next inner scale gives BDR information when the sonobuoy is at 800 feet below the layer depth. The PDR at sonobuoy depths of 60 and 800 feet is given respectively by the next inner scale and the innermost scale of annular plate 11.

The circular plate 12 comprises the power limited range information as discussed briefly heretofore. Reference to the cursor 18 of FIG. 2c discloses that this information is a function of the channel number (CH #), the sea state (SS #) and the target aspect. The target aspect, derived from experimental values in an empirical manner, is an indication of the measured signal strength as it bounces off or echoes from the target. If the target is a submarine, for example, there are three general positions in which it may orient itself with respect to an incident sonar signal. The positions are (1) broadside or beam; (2) bow or stern; or (3) the most general case at which the target is at some angle to the received signal. In this last position, the target is said to be quartering.

Empirically, the target strength is related to the effective scattering area of the target and hence to the target aspect by the equation, $$T = 10 \log \sigma/4\pi r_1^2 \qquad (1)$$

where, T is the target strength, $r_1$ is an assumed range reference level of $10^{-3}$ kiloyards, and $\sigma$ is the effective scattering area.

The target aspect is proportional to the scattering area $\sigma$ such that when the target is in the beam position the scattering area is maximized and when the target is in the bow or stern positions the scattering area is minimized. At the quartering position, the scattering area is at some intermediate value.

The target aspect figures appearing on the three outermost scales of circular plate 12 were obtained from Equation 1. The outermost of these scales is indicative of the beam position of the target, hence the B on the cursor. Similarly, the next concentric scale and that immediately concentric to it are representative of the quartering and bow-stern positions respectively for which Q and B/S appear on the cursor 18.

The target aspect values are also functions of the sea state (SS # appearing on cursor 18), a term of art related to ambient noise level, propogation loss, roughness of the sea and other phenomena. Sea state values have been determined experimentally, the resultant data being plotted. These graphs are known as Knudsen curves and may be found in the aforementioned Horton text. For practical purposes, sea state values of ½, 1, 2 and 3 are of importance, sonobuoy effectiveness decreasing as the sea state number increases. As sonobuoys are ineffective for sea state numbers greater than five, the present slide rule is provided with sea state numbers of ½, 1, 2, 3 and 5. These numbers are related radially to the target aspect values in a one-to-one correspondence in the same manner that the layer depths are related to the temperature gradient. Thus, since a target may be in any one of three positions for a given sea state and five sea states are available for practical purposes, circular plate 12 has been divided in fifteen radial segments, sonar data being applied along each radial segment to uniquely define a set of sonar conditions.

When the sonobuoy radio transmits the received echo signal, it does so at a particular frequency corresponding to the identifiable acoustic signal of the sonobuoy and the signal is received by a particular member-labeled channel in the receiving equipment aboard the aircraft. Thus, the CH # appearing on the cursor 18 is representative of the channel number at the receiving equipment in the aircraft as well as the acoustic frequency of the identifiable sonobuoy signal.

Having discussed the various elements of the circular slide rule and the sonar indicia appearing thereon, an example illustrating the use of the rule when arranged in an operative position for computation is presented below. Reference is made to FIG. 2c, FIGS. 3a and 3b, and FIGS. 4a and 4b.

Figure 3A:
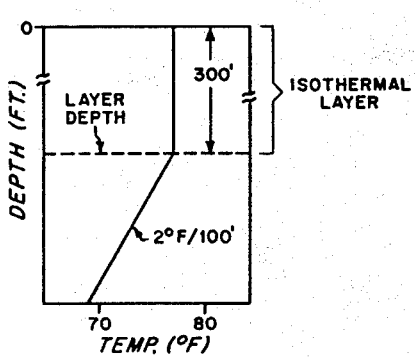
FIG. 3a is a typical bathythermogram.
Figure 3B:
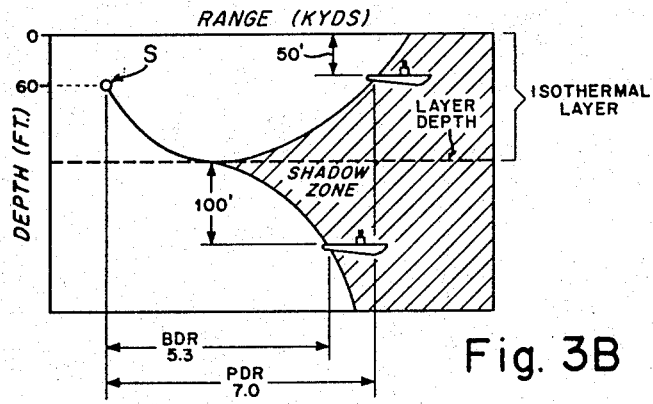
FIG. 3b is a typical ray chart heretofore necessary to determine the area ensonified when the transducer is located in the isothermal layer.
Figure 4A:
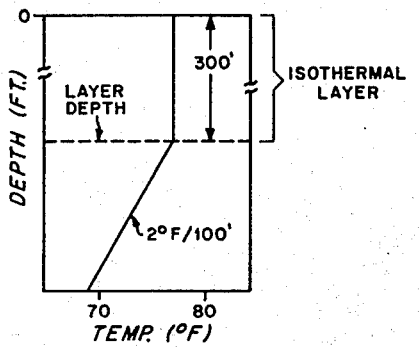
Figure 4B:
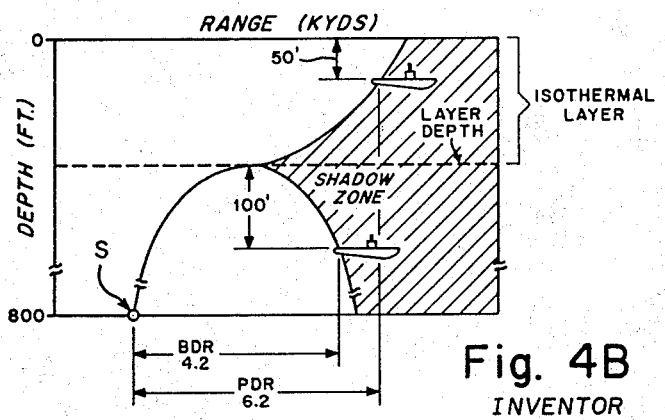
FIG. 4b is another typical ray chart heretofore necessary to determine the ensonified area when the transducer is located at a depth substantially below the isothermal layer.

Assume that prior to placing the sonobuoy in the water, prior testing has provided bathythermograph information such as the bathythermograms shown in FIGS. 3a and 4a. This information will normally be supplied to the operator prior to take-off such that all he need take with him is the circular slide rule. However, the thermograms of FIGS. 3a and 4a along with the ray diagrams of FIGS. 3b and 4b are shown for convenience and comparison purposes. It is again noted, however, that these diagrams and the requisite plotting equipment necessary to graph them are not required due to the present slide rule.

The thermograms of FIGS. 3a and 4a show that the region of interest has an isothermal layer of 300 feet with a temperature of approximately 77°. Thereafter the bathythermograms indicate that the temperature is decreasing at 2° Fahreinheit per 100 feet.

In FIG. 3b if the active sonobuoy S is placed 60 feet below the surface, the acoustic signals eminating therefrom will map the ray diagram shown in the manner heretofore discussed. Targets are postulated in the shadow zone or just beyond the limit of the ray path. The PDR or periscope depth range is that range from the sonobuoy to the target when the target is snorkeling or approximately 50 feet below the surface of the water. When the ray diagram of FIG. 3b is plotted to scale this PDR can be read from the graph. Similarly, the BDR or best depth range to avoid detection is that range from the sonobuoy to the target when the target is 100 feet below the layer depth as shown in FIG. 3b. Upon plotting the ray diagram this range can be measured therefrom. In like manner, as shown in FIG. 4b, the sonobuoy can be placed at 800 feet, the ray diagrams plotted, and the PDR and BDR measured. It is noted, however, that the operator must subjectively guess which of the two depths is best for maximum utilization of the sonobuoy hydrophone. The operator has no way of knowing whether the received information will be more accurate when the hydrophone is at 60 feet or when it is at 800 feet. Also, he has no way of knowing if the sonobuoy hydrophone, when placed at the subjectively chosen depth, will have sufficient power to produce a sonar signal over the range indicated by the ray diagram, be he interested in either the BDR or the PDR. The present slide rule provides this information accurately, eliminating subjective analysis by the operator.

Referring to FIG. 2c, the cursor 18 of the slide rule 10 rotated such that the aperture 20 thereof is positioned over the scales appearing upon annular plate 11 which show the 300 foot layer depth and the temperature gradient of 2° F. per hundred feet, this information having been provided previously. The operator is then immediately able to read the rule and note that if the sonobuoy is placed at 60 feet, the best depth range to avoid detection will be 5.3 kiloyards and that if the sonobuoy is placed at 800 feet the best depth range to avoid detection will be 4.2 kiloyards. Similarly, the periscope depth range at 60 feet is 7 kiloyards and at 800 feet is 6.2 kiloyards. This is the same information that is provided by the ray diagrams of FIGS. 3b and 4b but in a much more rapid and facile manner.

In general, the operator will be given the sea state information at the same time he is given the bathythermograph information. Assume that the sea state information was given to be equal to one-half, indicating a relatively calm sea. The channel number or numbers of the receiver equipment in the aircraft is preselected as noted heretofore. Assume that channels 6-8, inclusive, are operable to receive information.

Accordingly, positioning the inner circular plate 12 such that the channel numbers 6 to 8 and the sea state of one-half appear in the aperture 20 of cursor 18, it is seen that the operator can read the predicted range from the sonobuoy to the target as 5.7 kiloyards for beam, 4.5 kiloyards for quartering and 3.9 kiloyards for bow or stern target aspect. In the general case, the target will be quartering. Therefore, this is the case that will be discussed here. From the rule it is seen that the range from sonobuoy to target in a quartering position is 4.5 kiloyards. The best range to avoid detection when the sonobuoy is at 800 feet is 4.2 kiloyards and when the sonobuoy is at 60 feet is 5.3 kiloyards. Since the predicted range of the sonobuoy is determined from its power limitations to be only 4.5 kiloyards, nothing is gained in dipping the sonobuoy to the 800 foot depth. Therefore, the operator knows that he should place the sonobuoy at 60 feet rather than 800 feet. Similarly, since the periscope depth range in both the 60 foot and 800 foot cases is greater than the estimated range of 4.5 kiloyards, nothing is gained in dipping the sonobuoy to 800 feet for this case either. Thus, the operator knows that the sonobuoy is to be placed 60 feet below the surface of the water with an expected range of 4.5 kiloyards. The ray diagrams of FIGS. 3b and 4b it is seen would have yielded erroneous information as, due to propagation loss and sea noise, the range of the sonobuoy hydrophone signal is substantially attenuated. Moreover, this factor becomes very prevalent as the sea state value increases.

Knowing the best depth and the predicted range of the hydrophone, the operator may now drop a plurality of sonobuoys equipped with omnidirectional hydrophones in a predetermined pattern, for example a straight line, at a distance between hydrophones of approximately 9 kiloyards. For example, if hydrophones are dropped in a straight line from north to south, the operator can be reasonably sure that if a target is lurking in the area between the hydrophones or 4.5 kiloyards north or south thereof, or 4.5 kiloyards east or west thereof, the probability of detection of that target will be great.

Figure 2D:
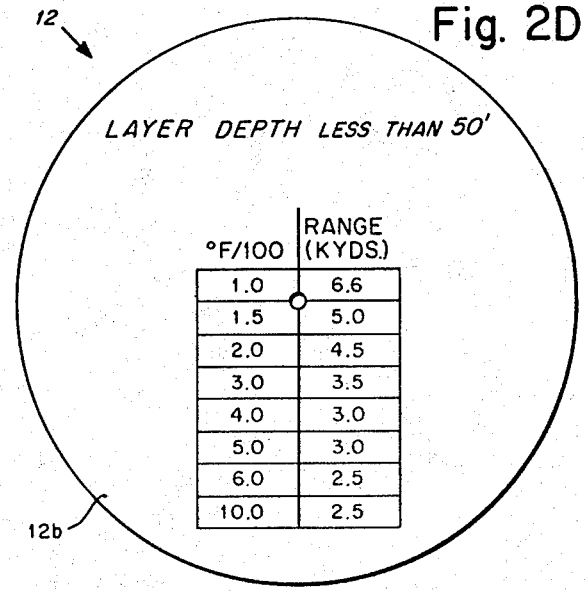
FIG. 2d is a view of the back of the circular plate of FIG. 2b with sonar data of temperature gradient and range thereon.

FIG. 2d is the special case when the layer depth is less than 50 feet. Under this condition, prior testing has shown that the 800 foot sonobuoy depth should always be used. To determine the range in this case, the power limited range is first determined from circular plate 12 as heretofore by knowing the sea state and the channel number and by assuming a quartering target. The table on the back of circular plate 12 is then consulted, wherein range in kiloyards is given as a function of temperature gradient in ° F. Knowing the temperature gradient, this range is read. The best estimated or predicted range will be the smaller of the two thereby determined ranges.

The many advantages of the present sonar slide rule should now be apparent. It is to be understood, however, that the above-described arrangements are illustrative of the application of the principles of the invention and of a preferred embodiment for the practicing thereof. It will of course be recognized that numerous modifications and alterations may be made in the above-described sonar slide rule without departing from the spirit and scope of the invention as set forth in the appended claim.

I claim:

1. A circular slide rule for determining the best of two underwater depths to operate an active sonobuoy, comprising:
   a circular plate having a first plurality of concentric scales of correlative indicia respectively of sea state number, channel number, predicted range for beam-aspected targets, predicted range for quarter-aspected targets, and predicted range for bow-stern-aspected targets, each indicum in each scale being radially aligned with the correlative indicia of the other scales;
   an annular plate concentric with and slidable about said circular plate having a second plurality of concentric scales of correlative indicia respectively of layer depth, temperature gradient, ray path best depth range at one detection depth, ray path best depth range at another detection depth, ray path periscope depth range at said one detection depth, and ray path periscope depth range at said other detection depth, each indicum in each scale being radially aligned with the correlative indicia of the other scales; and
   a cursor pivotally secured at the center of said circular plate and extending over each of said first and second pluralities of scales for radially correlating respective indicia.

References Cited

UNITED STATES PATENTS

| | | | |
|---|---|---|---|
| 1,338,588 | 4/1920 | Prescott | 235—84 |
| 3,266,721 | 5/1965 | Barron. | |

SAMUEL W. ENGLE, Primary Examiner

U.S. Cl. X.R.

235—78; 340—2